(12) United States Patent
Kobayashi

(10) Patent No.: US 7,210,688 B2
(45) Date of Patent: May 1, 2007

(54) SUSPENSION SYSTEM FOR MOTOR VEHICLE

(75) Inventor: Toshiyuki Kobayashi, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 144 days.

(21) Appl. No.: 10/284,172

(22) Filed: Oct. 31, 2002

(65) Prior Publication Data

US 2003/0090071 A1 May 15, 2003

(30) Foreign Application Priority Data

Nov. 14, 2001 (JP) .............................. 2001-348708

(51) Int. Cl.
*B60G 21/00* (2006.01)
(52) U.S. Cl. ................. 280/5.505; 267/64.28; 267/186; 280/5.506; 280/5.507; 280/124.104; 280/124.106; 280/124.159; 280/124.161
(58) Field of Classification Search ......... 280/124.104, 280/124.106, 124.158, 124.159, 124.161, 280/5.505, 5.506, 5.507, 124.15; 267/186, 267/64.28
See application file for complete search history.

(56) References Cited

U.S. PATENT DOCUMENTS

| | | | | |
|---|---|---|---|---|
| 3,032,349 A | * | 5/1962 | Fiala | .................... 280/124.158 |
| 3,068,023 A | | 12/1962 | Fiala | |
| 3,752,497 A | * | 8/1973 | Enke et al. | ............... 280/5.505 |
| 3,868,910 A | * | 3/1975 | Schultz | ........................ 105/164 |
| 5,401,053 A | | 3/1995 | Dietrich | |
| 6,024,366 A | * | 2/2000 | Masamura | ............. 280/124.162 |
| 6,270,098 B1 | * | 8/2001 | Heyring et al. | ........ 280/124.104 |
| 6,811,171 B2 | | 11/2004 | Sakai | |
| 7,131,654 B2 | | 11/2006 | Sakai | |
| 2001/0024005 A1 | * | 9/2001 | Sakai | ....................... 267/64.28 |
| 2004/0169345 A1 | | 9/2004 | Fontdecaba | |

FOREIGN PATENT DOCUMENTS

| | | |
|---|---|---|
| DE | 1 963 704 U | 7/1967 |
| DE | 39 36 987 A1 | 5/1991 |
| DE | 42 31 641 A1 | 3/1994 |
| EP | 1 116 610 A2 | 7/2001 |
| EP | 1 426 212 A2 | 6/2004 |
| JP | A-02-155817 | 6/1990 |
| JP | A 6-509997 | 11/1994 |
| JP | B2-08-009288 | 1/1996 |
| JP | A-08-072521 | 3/1996 |
| JP | A 9-193641 | 7/1997 |
| JP | A 2000-505755 | 5/2000 |
| JP | A-2002-272321 | 10/2000 |
| JP | A 2001-199216 | 7/2001 |
| JP | A-2002-179222 | 6/2002 |
| WO | WO 01/08910 A1 | 2/2001 |

* cited by examiner

*Primary Examiner*—Eric Culbreth
(74) *Attorney, Agent, or Firm*—Oliff & Berridge, PLC

(57) ABSTRACT

A vehicle suspension system of a motor vehicle includes a plurality of suspension devices mounted on the vehicle with respect to right and left wheels of the vehicle, respectively, a first behavior controller that controls the motion of each of the suspension devices when a vehicle body undergoes a first behavior, and a second behavior controller that controls the motion of each of the suspension devices when the vehicle body undergoes a second behavior, independently of the first behavior controller.

20 Claims, 7 Drawing Sheets

SUSPENSION SYSTEM FOR MOTOR VEHICLE

BACKGROUND OF THE INVENTION

1. Field of the Invention

The invention relates to a vehicle suspension system employed in a motor vehicle, such as a four-wheel vehicle, and in particular to a vehicle suspension system that includes vehicle behavior controllers that control the motion of each suspension device (e.g., hydraulic cylinder for suspension) mounted with respect to each of all right and left wheels, and is adapted to control or suppress particular types of behavior, such as bouncing, pitching and rolling, of a vehicle body.

2. Description of Related Art

An example of a vehicle suspension system of the above type is disclosed in, for example, Japanese laid-open Patent Publication No. 6-509997. In the vehicle suspension system disclosed in this publication, suspension hydraulic cylinders respectively mounted with respect to front and rear, right and left wheels of the vehicle are diagonally connected to each other by hydraulic pipes, so that the suspension system can suppress pitching and rolling of the vehicle body while assuring sufficient road-holding characteristic of the wheels on an unleveled ground.

The operating characteristics of the vehicle suspension system as shown in the above-indicated publication are determined by accumulators (e.g., gas springs) connected to and communicating with respective hydraulic pipes for connecting diagonally located cylinders, or accumulators connected to and communicating with the hydraulic pipes for connecting diagonally located cylinders and a single load distribution unit, or an actuator that includes a single load distribution unit to which the hydraulic pipes for connecting diagonally located cylinders are connected for fluid communication. With this arrangement, the operating characteristics of the suspension system cannot be individually or separately set for suppressing each type of vehicle behaviors, such as pitching and rolling, of the vehicle body. Thus, it has been difficult to set the operating characteristics of the suspension system suitable for each type of vehicle behavior.

In addition, the known vehicle suspension system as described above is constructed such that a pair of hydraulic chambers formed on the opposite sides of a piston in each of the suspension hydraulic cylinders are diagonally connected to a pair of hydraulic chambers formed in a corresponding suspension hydraulic cylinder that is located in a diagonal relationship with the above-indicated hydraulic cylinder. Namely, two ports formed in each of the suspension hydraulic cylinders are diagonally connected to two ports formed in the corresponding suspension hydraulic cylinder, to thus provide two hydraulic pipe systems. Thus, the hydraulic pipes are arranged in a complicated manner, which results in increased cost and weight of the pipes, and eventually those of the suspension system. While the vehicle suspension system as described above is able to suppress pitching and rolling of the vehicle body, the system is not able to suppress bouncing (i.e., behavior in the heaving direction) of the vehicle body.

SUMMARY OF THE INVENTION

In view of the above situations, the invention provides a vehicle suspension system of a motor vehicle, which includes a plurality of suspension devices mounted on the vehicle with respect to right and left wheels of the vehicle, respectively, a first behavior controller that controls a motion of each of the suspension devices when a vehicle body undergoes a first behavior, and a second behavior controller that controls a motion of each of the suspension devices when the vehicle body undergoes a second behavior, independently of the first behavior controller. In this case, the first behavior and the second behavior may be selected from bouncing, rolling and pitching of the vehicle body.

In the vehicle suspension system according to the above aspect of the invention, the motion of each of the suspension devices mounted on the vehicle with respect to all of the right and left wheels is controlled independently by the first behavior controller and the second behavior controller, and therefore the characteristics of the behavior controllers can be separately or individually set for respective types of behaviors. Thus, the characteristics of each behavior controller are independently set to those suitable for controlling or suppressing each type of behavior (e.g., bouncing, rolling or pitching), whereby each type of behavior can be optimally controlled or suppressed.

According to another aspect of the invention, the invention provides a vehicle suspension system of a motor vehicle, which includes (a) a plurality of suspension hydraulic cylinders mounted on the vehicle with respect to front-right, front-left, rear-right, rear-left wheels of the vehicle, each of the suspension hydraulic cylinders having a single port, and (b) a plurality of control hydraulic cylinders each of which is connected to the single port of a corresponding one of the suspension hydraulic cylinders via a pipe, for controlling a motion of the corresponding suspension hydraulic cylinder. In the vehicle suspension system, a pair of diagonal hydraulic control cylinders are provided by connecting the control hydraulic cylinders such that hydraulic pressures in two of the control hydraulic cylinders connected to diagonally located ones of the suspension hydraulic cylinders change in substantially the same way, and the pair of diagonal hydraulic control cylinders are opposed to each other and coupled by a coupling device capable of controlling motions of the diagonal hydraulic control cylinders.

In the vehicle suspension system according to the above aspect of the invention, a hydraulic circuit is constructed by connecting the single ports of the respective suspension hydraulic cylinders mounted for the front and rear, right and left wheels, to the corresponding control hydraulic cylinders, via respective pipes. Thus, the hydraulic circuit can be simply constructed at a relatively low cost. Furthermore, the vehicle suspension system is able to not only effectively suppress the behavior (bouncing) of the vehicle body in the heaving direction, but also suitably deal with the situation where a force that twists the vehicle body is applied to the front and rear, right and left wheels when the vehicle is running on an unleveled ground, for example. More specifically, when the vehicle body twists on an unleveled ground, the pair of diagonal hydraulic control cylinders are freely operated in the same phase or direction, and therefore the vertical load and driving force measured at each wheel are less likely to be reduced. Thus, the vehicle suspension system permits the vehicle posture or attitude to be favorably maintained while assuring sufficient driving force of each wheel, without making the hydraulic circuit undesirably complicated.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein.

DETAILED DESCRIPTION OF PREFERRED EMBODIMENT(S)

Figure 1:
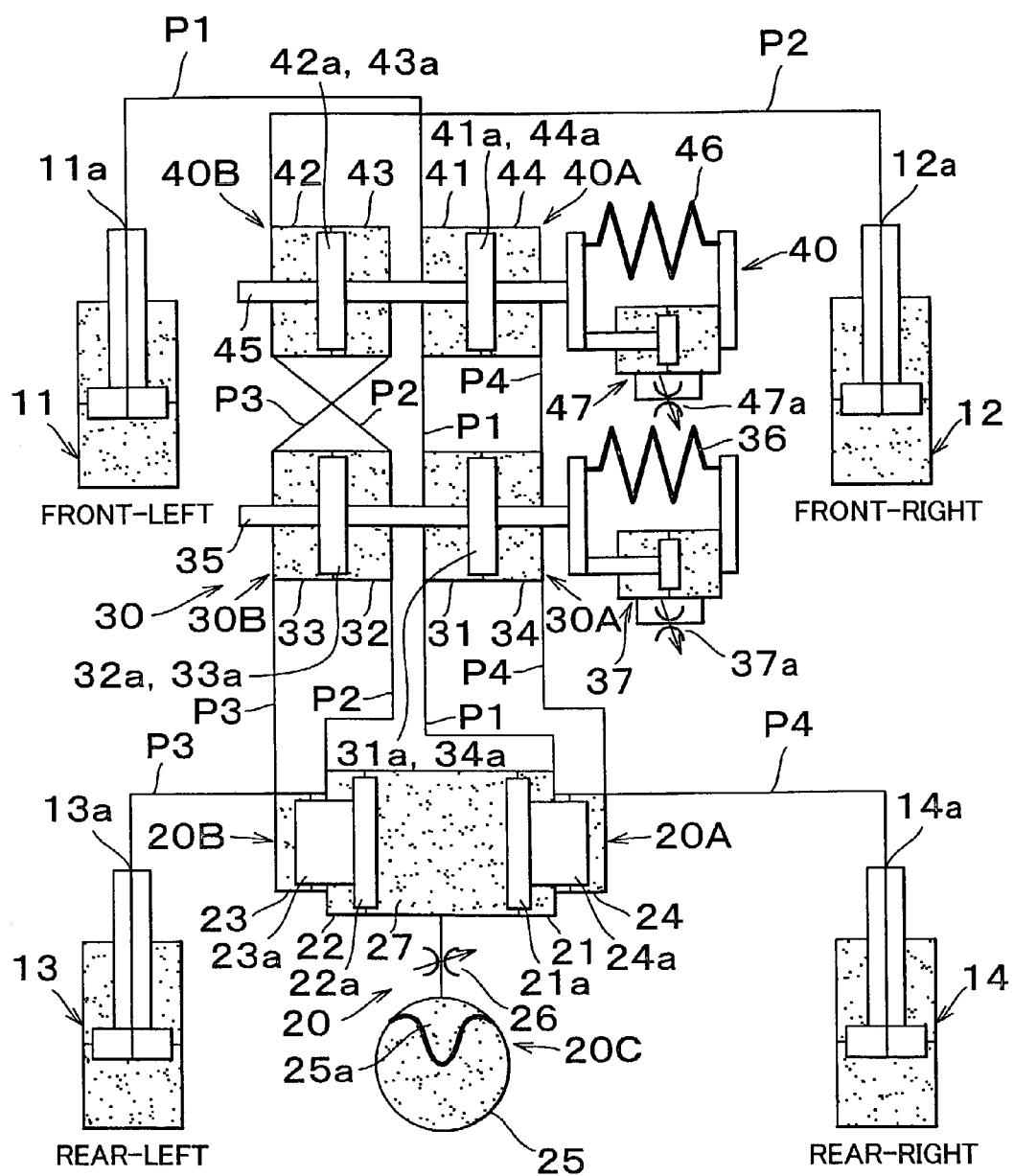
FIG. 1 is a hydraulic circuit diagram schematically showing one exemplary embodiment of a vehicle suspension system of the invention.

One exemplary embodiment of the invention will be described in detail with reference to the accompanying drawings. FIG. 1 schematically shows a suspension system of a motor vehicle according to the embodiment of the invention. In the suspension system, each of suspension hydraulic cylinders 11, 12, 13, 14 is connected to a bouncing controller 20, a rolling controller 30 and a pitching controller 40, via respective pipes P1, P2, P3, P4. The suspension hydraulic cylinders 11, 12, 13, 14 are mounted on the vehicle with respect to front and rear, right and left wheels, and have single ports 11a, 12a, 13a, 14a, respectively.

The bouncing controller 20 functions to control the motions of the suspension hydraulic cylinders 11, 12, 13, 14 when bouncing as one type of vehicle behavior occurs, and includes bouncing control cylinders 21, 22, 23, 24 that are respectively connected to the ports 11a, 12a, 13a, 14a of the suspension hydraulic cylinders 11, 12, 13, 14 via the pipes P1, P2, P3, P4, respectively. The bouncing control cylinders 21, 22, 23, 24 include respective pistons 21a, 22a, 23a, 24a, which have substantially the same pressure-receiving area.

The bouncing control cylinders 21, 24 are respectively connected to the suspension hydraulic cylinders 11, 14 that are located diagonally in the vicinity of the front, left wheel and the rear, right wheel, such that the hydraulic pressures in the cylinders 21, 24 change in the same way. Namely, the pistons 21a, 24a in the bouncing control cylinders 21, 24 move in the same direction in accordance with increases and decreases in the hydraulic pressures applied thereto. The bouncing control cylinders 21, 24 constitute a diagonal hydraulic control cylinder 20A, in which the pistons 21a, 24a of the bouncing control cylinders 21, 24 are coupled to each other and are formed as an integral assembly or unit.

On the other hand, the bouncing control cylinders 22, 23 are respectively connected to the suspension hydraulic cylinders 12, 13 located diagonally in the vicinity of the front, right wheel and the rear, left wheel, such that the hydraulic pressures in the cylinders 22, 23 change in the same way. Namely, the pistons 22a, 23a in the bouncing control cylinders 22, 23 move in the same direction in accordance with increases and decreases in the hydraulic pressures applied thereto. The bouncing control cylinders 22, 23 constitute a diagonal hydraulic control cylinder 20B, in which the pistons 22a, 23a of the bouncing control cylinders 22, 23 are coupled to each other and are formed as an integral assembly or unit.

The diagonal hydraulic control cylinders 20A, 20B are constructed in symmetric shape, and are disposed opposite to each other. The cylinders 20A, 20B are connected to a coupling device 20C that is operable to control the motions of the diagonal hydraulic cylinders 20A, 20B. The coupling device 20C includes an accumulator 25 that functions as a spring element and is operable by using, for example, a gas or a spring. The coupling device 20C is a liquid-tight coupling structure using a hydraulic fluid as a medium, and is provided with a hydraulic chamber 27 that communicates with a hydraulic chamber 25a of the accumulator 25 via a variable restrictor 26 that functions as a damping element for suppressing vibration of the spring element.

The rolling controller 30 functions to control the motions of the suspension hydraulic cylinders 11, 12, 13, 14 when rolling as another type of vehicle behavior occurs, and includes rolling control cylinders 31, 32, 33, 34 that are respectively connected to the ports 11a, 12a, 13a, 14a of the suspension hydraulic cylinders 11, 12, 13, 14 via the pipes P1, P2, P3, P4, respectively. The rolling control cylinders 31, 32, 33, 34 include respective piston surfaces 31a, 32a, 33a, 34a, which have substantially the same pressure-receiving area.

The rolling control cylinders 31, 34 are respectively connected to the suspension hydraulic cylinders 11, 14 that are located diagonally in the vicinity of the front, left wheel and the rear, right wheel, such that the hydraulic pressures in the cylinders 31, 34 change in the opposite way. Namely, the pistons 31a, 34a move in the opposite directions in accordance with increases and decreases in the hydraulic pressures in the cylinders 31, 34. The rolling control cylinders 31, 34 constitute a right-versus-left rolling control cylinder 30A, in which the piston surfaces 31a, 34a of the rolling control cylinders 31, 34 are formed as an integral, common member.

On the other hand, the rolling control cylinders 32, 33 are respectively connected to the suspension hydraulic cylinders 12, 13 that are located diagonally in the vicinity of the front, right wheel and the rear, left wheel, such that the hydraulic pressures in the cylinders 32, 33 change in the opposite way. Namely, the piston surfaces 32a, 33a move in the opposite directions in accordance with increases and decreases in the hydraulic pressures in the cylinders 32, 33. The rolling control cylinders 32, 33 constitute a right-versus-left rolling cylinder 30B, in the piston surfaces 32a, 33a of the rolling control cylinders 32, 33 are formed as an integral, common number.

The right-versus-left rolling control cylinders 30A, 30B are arranged in the same phase and the piston surfaces 31a, 34a and the piston surfaces 32a, 33a are connected to each other by a coupling rod 35, such that the piston surfaces 31a, 34a and the piston surfaces 32a, 33a are both pushed to the right as viewed in FIG. 1 when the hydraulic pressures of both of the left-side suspension hydraulic cylinders 11, 13 increase, for example. The coupling rod 35 extends beyond the cylinders 31–34, and its extended end portion is connected to one end of a coil spring 36 that serves as a spring element, and is also connected to one end of a shock absorber 37 that serves as a damping element for suppressing or damping vibration of the spring element. With this arrangement, the coil spring 36 and the shock absorber 37 cooperate with each other to restrict or control the motion (i.e., axial movement) of the connecting rod 35.

The pitching controller 40 functions to control the motions of the suspension hydraulic cylinders 11, 12, 13, 14 when pitching as another type of vehicle behavior occurs, and includes pitching control cylinders 41, 42, 43, 44 that are respectively connected to the ports 11a, 12a, 13a, 14a of the suspension hydraulic cylinders 11, 12, 13, 14 via the pipes P1, P2, P3, P4, respectively. The pitching control cylinders 41, 42, 43, 44 include respective piston surfaces 41a, 42a, 43a, 44a, which have substantially the same pressure-receiving area.

The pitching control cylinders 41, 44 are respectively connected to the suspension hydraulic cylinders 11, 14 that are located diagonally in the vicinity of the front, left wheel and the rear, right wheel, such that the hydraulic pressures in the cylinders 41, 44 change in the opposite way. Namely, the piston surfaces 41a, 44a move in the opposite directions in accordance with increases and decreases in the hydraulic pressures within the cylinders 41, 44. The pitching control cylinders 41, 44 constitute a front-versus-rear pitching control cylinder 40A, in which the piston surfaces 41a, 44a of the pitching control cylinders 41, 44 are formed as an integral, common member.

On the other hand, the pitching control cylinders 42, 43 are respectively connected to the suspension hydraulic cylinders 12, 13 that are located diagonally in the vicinity of the front, right wheel and the rear, left wheel, such that the hydraulic pressures in the cylinders 42, 43 change in the opposite way. Namely, the piston surfaces 42a, 43a move in the opposite directions in accordance with increases and decreases in the hydraulic pressures within the cylinders 42, 43. The pitching control cylinders 42, 43 constitute a front-versus-rear pitching control cylinder 40B, in which the piston surfaces 42a, 43a of the pitching control cylinders 42, 43 are formed as an integral, common member.

The front-versus-rear pitching control cylinders 40A, 40B are arranged in the same phase and the piston 41a, 44a and the piston 42a, 43a are connected to each other by a coupling rod 45 such that the piston 41a, 44a and the piston 42a, 43a are both pushed to the right as viewed in FIG. 1 when the hydraulic pressures of both of the front-side suspension hydraulic cylinders 11, 12 increase, for example. The coupling rod 45 extends beyond the cylinders 41–44, and its extended end portion is connected to one end of a coil spring 46 that serves as a spring element, and is also connected to one end of a shock absorber 47 that serves as a damping element for suppressing or damping vibration of the spring element. With this arrangement, the coil spring 46 and the shock absorber 47 cooperate with each other to restrict or control the motion (i.e., axial movement) of the coupling rod 45.

Figure 2:
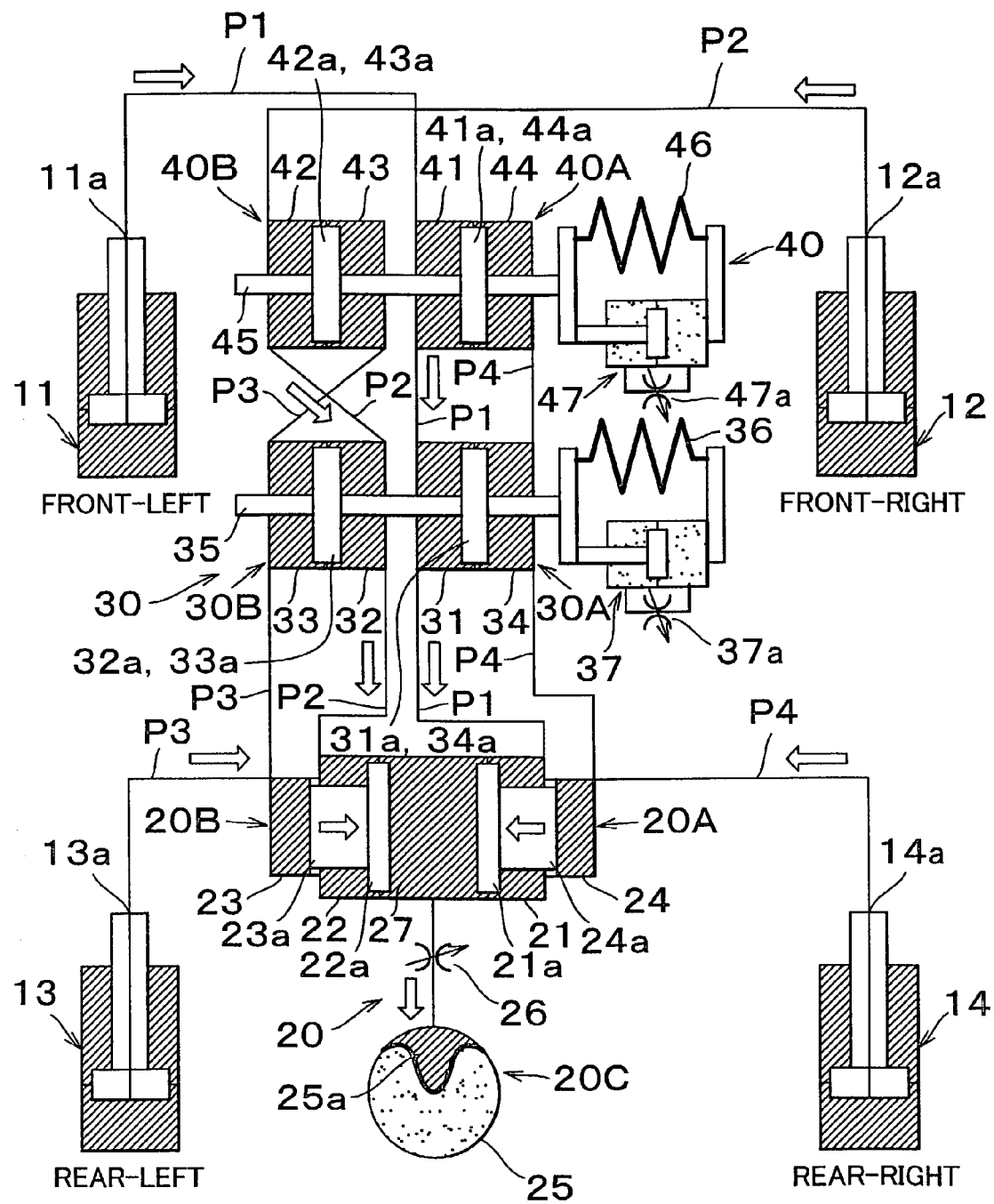
FIG. 2 is a view showing an operating state of the vehicle suspension system as shown in FIG. 1 at the time of bouncing of the vehicle body.

In the vehicle suspension system of the embodiment constructed as described above, the suspension hydraulic cylinders 11, 12, 13, 14 make substantially the same movements (compressing motions) when the vehicle body bounces, as illustrated in FIG. 2. As a result, substantially the same hydraulic pressures (high pressures) are supplied from the ports 11a, 12a, 13a, 14a to the corresponding control cylinders 21–24, 31–34 and 41–44 through the pipes P1, P2, P3, P4, respectively.

Figure 3:
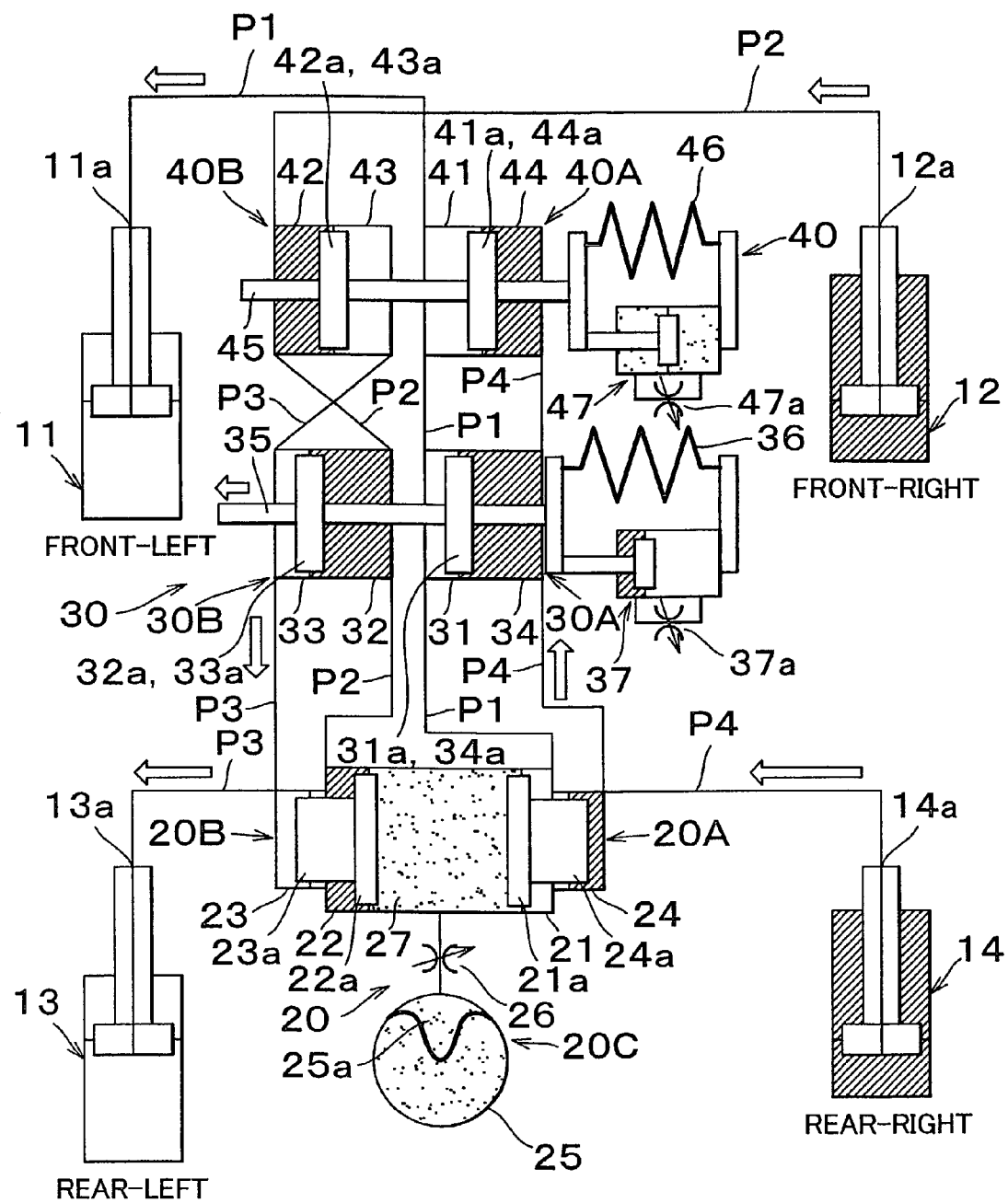
FIG. 3 is a view showing an operating state of the vehicle suspension system as shown in FIG. 1 at the time of rolling of the vehicle body (e.g., when the vehicle turns left)

In this condition, the hydraulic pressures in each pair of the control cylinders 31, 34, 32, 33, 41, 44 and 42, 43 of the rolling controller 30 and the pitching controller 40 are balanced with each other, and each of the pistons 31a (34a), 32a (33a), 41a (44a) and 42a (43a) makes substantially no movement. In the bouncing controller 20, on the other hand, the pistons 21a, 22a, 23a, 24a move under the operations of the accumulator 25 and the variable restrictor 26, thereby to suppress or retard the motions of the suspension hydraulic cylinders 11, 12, 13, 14. In this manner, the bouncing controller 20 suppresses bouncing of the vehicle body, and also mitigates shocks from the road surface When the vehicle body rolls, for example, when the vehicle turns left, the right-side suspension hydraulic cylinders 12, 14 make substantially the same movements (compressing motions) while the left-side suspension hydraulic cylinders 11, 13 make substantially the same movements (expanding motions), as illustrated in FIG. 3. As a result, substantially the same hydraulic pressures (high pressures) are supplied from the ports 12a, 14a of the right-side suspension hydraulic cylinders 12, 14 to each pair of the control cylinders 22, 24, 32, 34, and 42, 44 through the pipes P2, P4, respectively, and substantially the same hydraulic pressures (low pressures) are supplied from each pair of the control cylinders 21, 23, 31, 33, and 41, 43 to the ports 11a, 13a of the left-side suspension hydraulic cylinders 11, 13 through the pipes P1, P3, respectively.

In this condition, the hydraulic pressures in the control cylinders 21, 24 are balanced with those in the control cylinders 22, 23 in the bouncing controller 20, and the hydraulic pressures in the control cylinders 41, 44 are balanced with those in the control cylinders 42, 43 in the pitching controller 40, so that each of the pistons 21a, 24a, 22a, 23a, 41a (44a), 42a (43a) makes substantially no movement. In the rolling controller 30, on the other hand, the pistons 31a (34a) and 32a (33a) connected to each other by the coupling rod 35 move under the operations of the coil spring 36 and the shock absorber 37, thereby to suppress or retard the motions of the suspension hydraulic cylinders 11, 12, 13, 14. In this manner, the rolling controller 30 suppresses rolling of the vehicle body.

Figure 4:
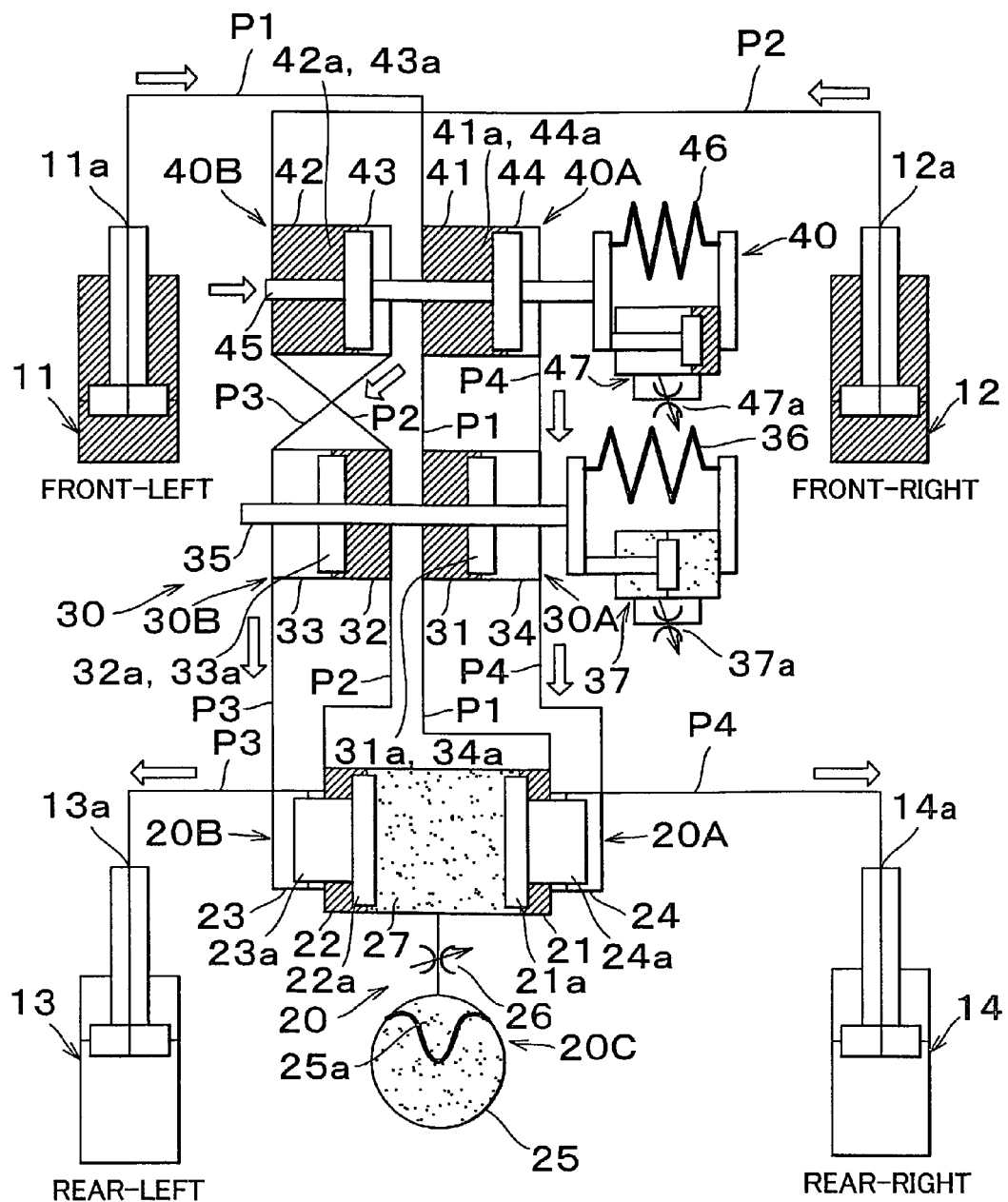
FIG. 4 is a view showing an operating state of the vehicle suspension system as shown in FIG. 1 at the time of pitching of the vehicle body (e.g., when the vehicle dives)

When the vehicle body undergoes pitching, for example, when the vehicle dives, the front-side suspension hydraulic cylinders 11, 12 make substantially the same movements (compressing motions) while the rear-side suspension hydraulic cylinders 13, 14 make substantially the same movements (expanding motions), as illustrated in FIG. 4. As a result, substantially the same hydraulic pressures (high pressures) are supplied from the ports 11, 12a of the front-side suspension hydraulic cylinders 11, 12 to each pair of the control cylinders 21, 22, 31, 32 and 41, 42 through the pipes P1, P2, respectively, and substantially the same hydraulic pressures (low pressures) are supplied from each pair of the control cylinders 23, 24, 33, 34 and 43, 44 to the ports 13a, 14a of the rear-side suspension hydraulic cylinders 13, 14 through the pipes P3, P4, respectively.

In this condition, the hydraulic pressures in the control cylinders 21, 24 are balanced with those in the control cylinders 22, 23 in the bouncing controller 20, and the hydraulic pressures in the control cylinders 31, 34 are balanced with those in the control cylinders 32, 33 in the rolling controller 30, so that each of the pistons 21a, 24a, 22a, 23a, 31a (34a), 32a (33a) makes substantially no movement. In the pitching controller 40, on the other hand, the pistons 41a (44a) and 42a (43a) connected to each other by the coupling rod 45 move under the operations of the coil spring 46 and the shock absorber 47, thereby to suppress or retard the motions of the suspension hydraulic cylinders 11, 12, 13, 14. In this manner, the pitching controller 40 suppresses pitching of the vehicle body.

Figure 5:
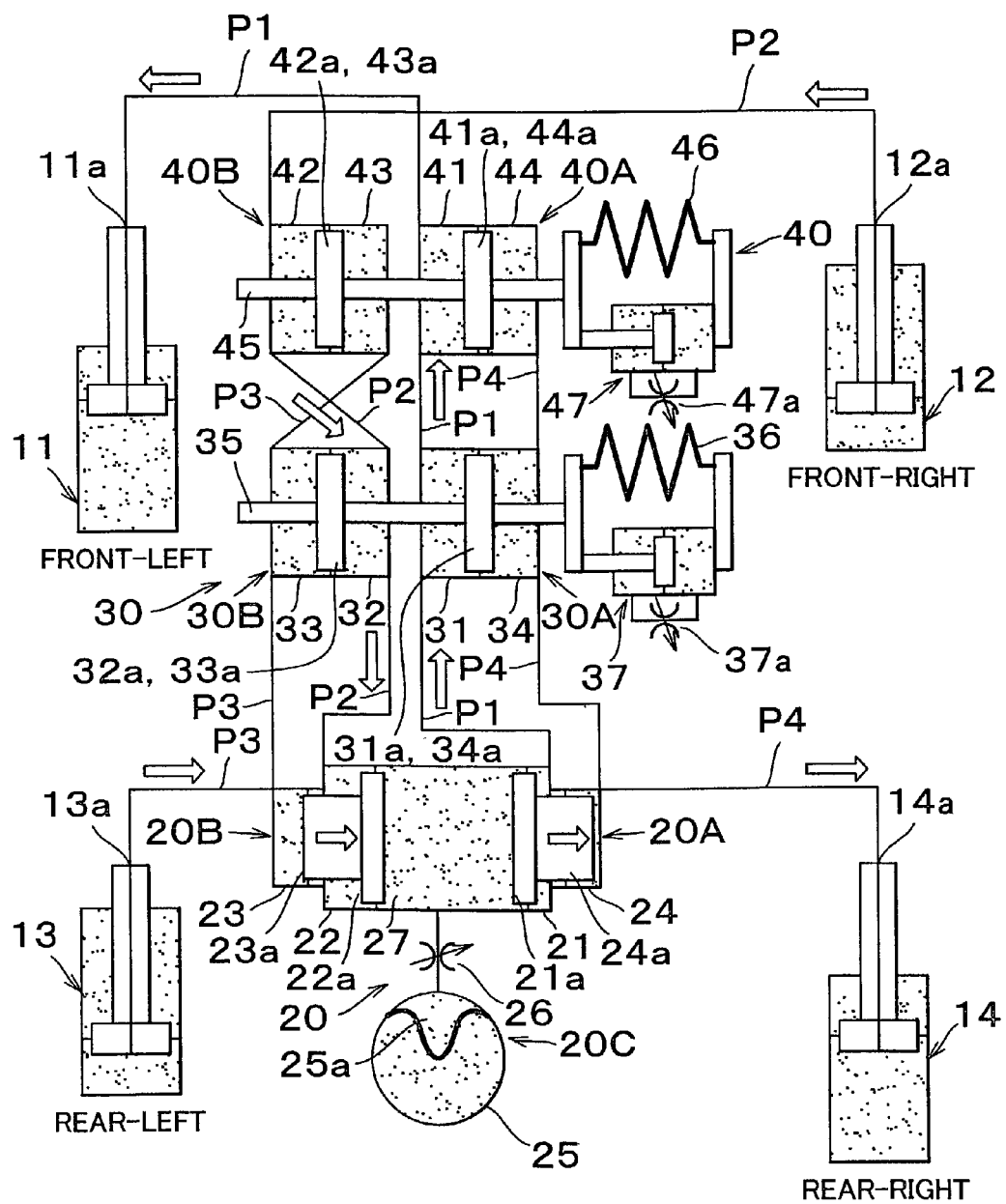
FIG. 5 is a view showing an operating state of the vehicle suspension system as shown in FIG. 1 at the time of twisting of the vehicle.

When the vehicle twists on an unleveled ground, for example, the front-right and rear-left suspension hydraulic cylinders 12, 13 make substantially the same movements (compressing motions) while the front-left and rear-right suspension hydraulic cylinders 11, 14 make substantially the same movements (expanding motions), as illustrated in FIG. 5. As a result, substantially the same hydraulic pressures (neutral hydraulic pressures as shown in FIG. 1) are supplied from the ports 12a, 13a of the suspension hydraulic cylinders 12, 13 to each pair of the control cylinders 22, 23, 32, 33 and 42, 43 through the pipes P2, P3, respectively, and substantially the same hydraulic pressures (neutral hydraulic pressures as shown in FIG. 1) are supplied from each pair of the control cylinders 21, 24, 31, 34 and 41, 44 to the ports 11a, 14a of the suspension hydraulic cylinders 11, 14 through the pipes P1, P4, respectively.

In this condition, the hydraulic pressures in the control cylinders 31, 34, 32, 33 are balanced with each other in the rolling controller 30, and the hydraulic pressure in the control cylinders 41, 44, 42, 43 are balanced with each other in the pitching controller 40, so that each of the pistons 31a (34a), 32a (33a), 41a (44a), 42a (43a) makes substantially no movement. In the bouncing controller 20, on the other hand, hydraulic fluid is supplied to each of the control cylinders 22, 23, and hydraulic fluid is discharged from each of the control cylinders 21, 24 whereby the pistons 21a, 24a move in the same direction as the pistons 22a, 23a. However, since the moving amount of the pistons 21a, 24a is the same as that of the pistons 22a, 23a, the bouncing controller 20 does not substantially function. Namely, the bouncing controller 20 does not operate to suppress the motions of the suspension hydraulic cylinders 11, 12, 13, 14.

As is apparent from the above description, the vehicle suspension system of this embodiment is constructed such that the motions of the suspension hydraulic cylinders 11, 12, 13, 14 are independently restricted or controlled by the bouncing controller 20 including the accumulator 25 (spring element) and the variable restrictor 26 (damping element), the rolling controller 30 including the coil spring 36 (spring element) and the shock absorber 37 (damping element), and the pitching controller 40 including the coil spring 46 (spring element) and the shock absorber 47 (damping element). It is also possible to independently set the characteristics of the respective spring elements and damping elements that specify the behavior controlling (or restricting) functions of the controllers 20, 30, 40. Thus, the characteristics of the spring and damping elements of each controller 20, 30, 40 can be independently set to those suitable for each of plural types of behavior of the vehicle body, and therefore each type of behavior can be optimally suppressed.

In the vehicle suspension system of this embodiment, a hydraulic circuit is constructed by simply connecting the single ports 11a–14a of the suspension hydraulic cylinders 11–14 mounted for the front and rear, right and left wheels, to the corresponding cylinders 21–24, 31–34 and 41–44, via the respective pipes P1–P4. Thus, the hydraulic circuit can be made simple and inexpensive. Furthermore, the vehicle suspension system of the embodiment is able to not only effectively suppress the behavior (i.e., bouncing) of the vehicle body in the heaving direction, but also suitably deal with the situation where a force that twists the vehicle body is applied to the front and rear, right and left wheels when the vehicle is traveling on an unleveled ground, for example. More specifically, when the vehicle body twists on such an unleveled ground, the diagonal hydraulic control cylinders 20A, 20B freely operate in the same phase (namely, the pistons 21a, 24a, 22a, 23a move in the same direction) without actuating the accumulator 25 provided in the bouncing controller 20, and therefore the vertical load and driving force measured at each wheel are less likely to be reduced. Thus, the vehicle suspension system permits the vehicle posture or attitude to be favorably maintained while assuring sufficient driving force of each wheel, without making the hydraulic circuit undesirably complicated.

In the bouncing controller 20 of the vehicle suspension system of this embodiment, the pistons 21a, 24a of the bouncing control cylinders 21, 24 that constitutes the diagonal hydraulic control cylinder 20A are coupled to each other, and the pistons 22a, 23a of the bouncing control cylinders 22, 23 that constitute the diagonal hydraulic control cylinder 20B are coupled to each other. Thus, the diagonal hydraulic control cylinders 20A, 20B can be made compact or small-sized.

In the vehicle suspension system of this embodiment, the coupling device 20C that couples the diagonal hydraulic control cylinders 20A, 20B in the bouncing controller 20 includes the accumulator 25 and the variable restrictor 26, and takes the form of a liquid-tight coupling structure using a hydraulic fluid as a medium. The coupling device 20C may be modified such that a hydraulic fluid oil is also supplied to or drained from the hydraulic chamber 27 that communicates with the accumulator 25 via the variable restrictor 26 (or the hydraulic chamber 25a of the accumulator 25) in accordance with, for example, the load of the vehicle body, so that the vehicle height can be adjusted while maintaining the vehicle posture or attitude.

In the vehicle suspension system of this embodiment, the rolling controller 30 and the pitching controller 40 are provided in addition to the bouncing controller 20. This arrangement makes it possible to suppress or control the behavior (rolling) of the vehicle body in the rolling direction and the behavior (pitching) of the vehicle body in the pitching direction, as well as the behavior (bouncing) of the vehicle body in the heaving direction.

In the vehicle suspension system of this embodiment, at least one of the variable restrictor 26 of the bouncing controller 20, a variable restrictor 37a included in the shock absorber 37 of the rolling controller 30, and a variable restrictor 47a included in the shock absorber 47 of the pitching controller 40 may be provided with a characteristic switching mechanism (i.e., actuator). With the characteristic switching mechanism thus provided, semi-active control of the damping force can be performed with respect to each type of behavior of the vehicle body, thus assuring further improved vehicle riding comfort. In this case, the maximum number of required actuators is three, which is less by one than four actuators that would be otherwise required in the case where semi-active control of the damping force is independently performed with respect to the four wheels.

In the vehicle suspension system of this embodiment, an actuator may be provided for controlling increases and decreases in the hydraulic pressure of the hydraulic chamber 27 in the bouncing controller 20, or an actuator may be provided for controlling increases and decreases in the spring force of the coil spring 36 in the rolling controller 30, or an actuator may be provided for controlling increases and decreases in the spring force of the coil spring 46 in the pitching controller 40. With such actuator or actuators provided, the vehicle posture or attitude can be suitably controlled.

In this case, if the bouncing controller 20 is semi-actively operated, and the rolling controller 30 and the pitching controller 40 are actively operated, for example, the semi-actively operating bouncing controller 20 is able to support the load of the vehicle body, thus eliminating a need for the actively operating rolling controller 30 and pitching controller 40 to support the vehicle body load. This leads to a reduction in the size of actuators (or other power sources) employed for actively operating the rolling controller 30 and the pitching controller 40, resulting in a reduction of the energy consumed by the actuators.

Figure 6:
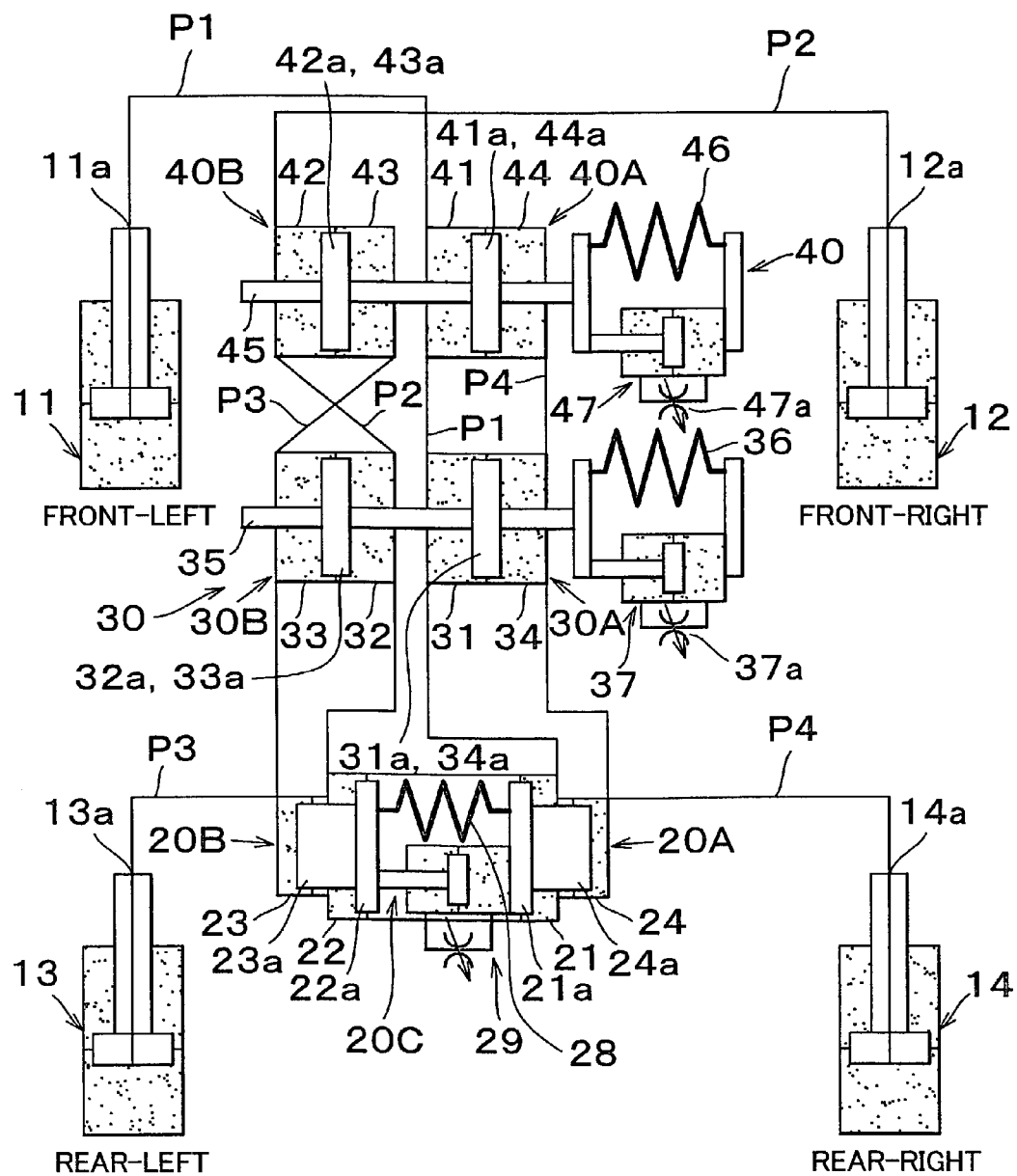
FIG. 6 is a hydraulic circuit diagram schematically showing another embodiment of a vehicle suspension system of the invention.

In the illustrated embodiment, the coupling device 20C for coupling the diagonal hydraulic control cylinders 20A, 20B in the bouncing controller 20 includes the accumulator 25, the variable restrictor 26, and the hydraulic cylinder 27. However, the invention is not limited to this arrangement of the coupling device 20C. As shown in FIG. 6, for example, the coupling device 20C for coupling the diagonal hydraulic control cylinders 20A, 20B in the bouncing controller 20 may include a coil spring 28 and a shock absorber 29. In the modified embodiment of FIG. 6, too, the bouncing controller 20, the rolling controller 30 and the pitching controller 40 may be semi-actively or actively operated as needed, in a manner similar to that of the illustrated embodiment.

Figure 7:
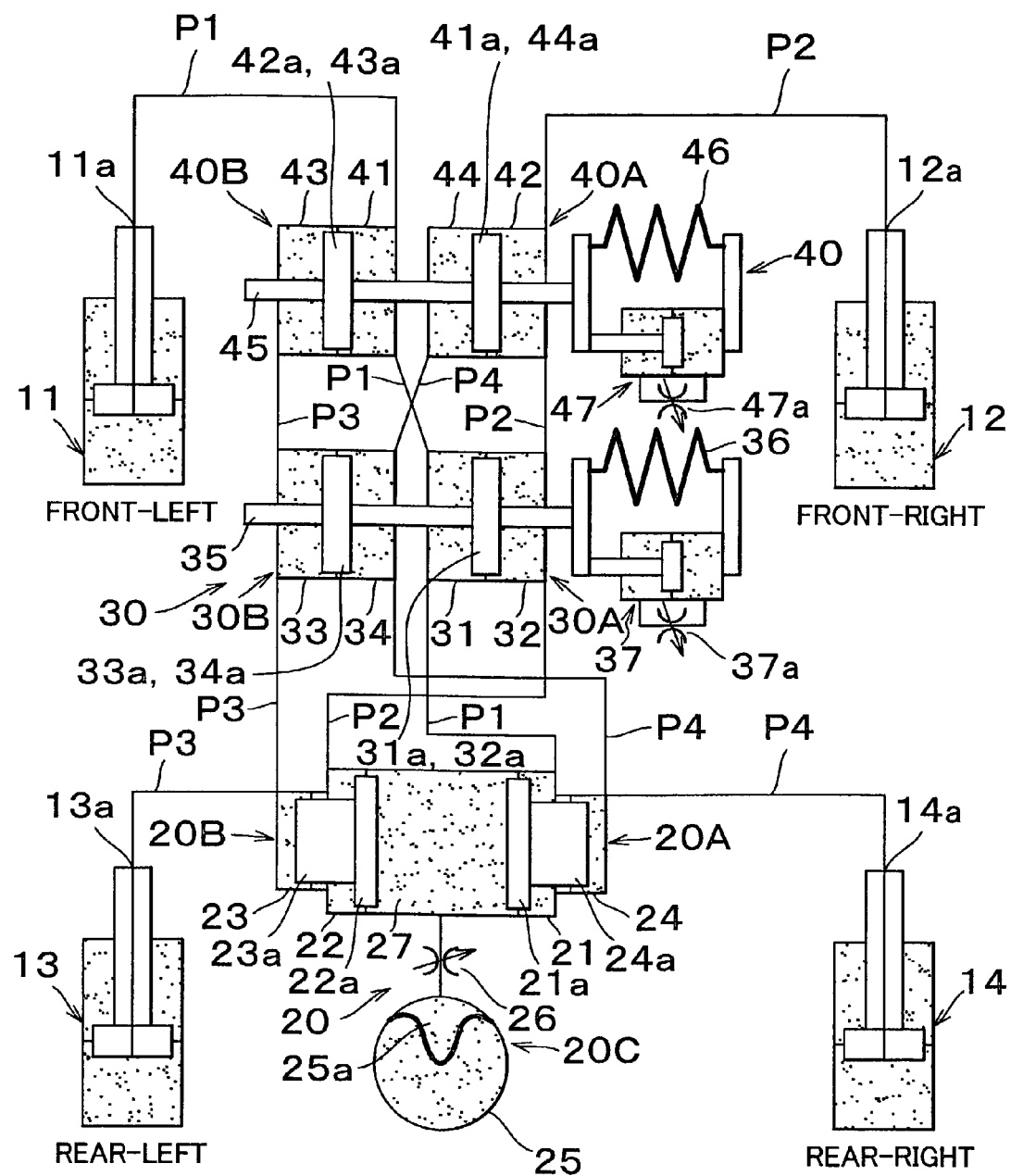
FIG. 7 is a hydraulic circuit diagram schematically showing a further embodiment of a vehicle suspension system of the invention.

In the illustrated embodiment, the pipes P1, P2, P3 and P4 are connected in the manner as shown in FIG. 1, to provide the effects as described above. However, the invention is not limited to this arrangement. For example, the pipes P1, P2, P3 and P4 may be connected as shown in FIG. 7 so as to provide effects similar to those of the illustrated embodiment. It is to be noted that the embodiment as shown in FIG. 7 is identical with that of FIG. 1 except the constructions of the right-versus-left rolling control cylinders 30A, 30B of the rolling controller 30 and the front-versus-rear pitching control cylinders 40A, 40B of the pitching controller 40.

In the right-versus-left rolling control cylinder 30A as shown in FIG. 7, the rolling control cylinders 31, 32 are connected to each other such that the hydraulic pressures in the rolling control cylinders 31, 32 change in the opposite way, and the pistons 31a, 32a of the rolling control cylinders 31, 32 are integrated into a single, common piston. In the right-versus-left rolling control cylinder 30B, the rolling control cylinders 33, 34 are connected to each other such that the hydraulic pressures in the rolling control cylinders 33, 34 change in the opposite way, and the pistons 33a, 34a of the rolling control cylinders 33, 34 are integrated into a single, common piston.

In the front-versus-rear pitching control cylinder 40A as shown in FIG. 7, on the other hand, the pitching control cylinders 42, 44 are connected to each other such that the hydraulic pressures in the pitching control cylinders 42, 44 change in the opposite way, and the pistons 42a, 44a of the pitching control cylinders 42, 44 are integrated into a single, common piston. In the front-versus-rear pitching control cylinder 40B, the pitching control cylinders 41, 43 are connected to each other such that the hydraulic pressures in the pitching control cylinders 41, 43 change in the opposite way, and the pistons 41a, 43a of the pitching control cylinders 41, 43 are integrated into a single, common piston.

In the illustrated embodiments, it is assumed that substantially the same hydraulic pressure is supplied to appropriate ones of the control cylinders (21–24, 31–34, 41–44) activated upon bouncing, rolling or pitching of the vehicle body. On the basis of this assumption, each of the pistons (21a–24a, 31a–34a, 41a–44a) is provided with substantially the same pressure-receiving area, so as to achieve a desired balance in the hydraulic pressure. If the vehicle suspension system is constructed such that substantially the same hydraulic pressure is not supplied to appropriate ones of the control cylinders at the time of bouncing, rolling or pitching, the pressure-receiving area of each piston may be set to a suitable value, so as to achieve a desired balance in the hydraulic pressure. Thus, the pressure-receiving area of each of the pistons (21a–24a, 31a–34a, 41a, 44a) need not be set to substantially the same value.

In the illustrated embodiment, the vehicle suspension system includes three behavior controllers, i.e., the bouncing controller 20, the rolling controller 30, and the pitching controller 40. However, the vehicle suspension system may include only two behavior controllers, e.g., the bouncing controller 20 and the rolling controller 30, or the bouncing controller 20 and the pitching controller 40, or the rolling controller 30 and the pitching controller 40.

What is claimed is:

1. A vehicle suspension system of a motor vehicle, comprising:
   a plurality of suspension devices mounted on the vehicle with respect to right and left wheels of the vehicle, respectively;
   a rolling controller that controls a motion of each of the suspension devices when a vehicle body undergoes a rolling;
   a pitching controller that controls a motion of each of the suspension devices when the vehicle body undergoes a pitching, independently of the rolling controller; and
   a bouncing controller that controls a motion of each of the suspension devices during bouncing of the vehicle body,
   wherein the bouncing controller, rolling controller, and pitching controller each operate independently and each controller includes an accumulator or a spring as a spring element and a variable resistor or a shock absorber as a damping element, the spring element and the damping element defining a behavior suppression function for each controller.

2. A vehicle suspension system of a motor vehicle, comprising:
   a plurality of suspension hydraulic cylinder portions mounted on the vehicle with respect to front-right, front-left, rear-right, and rear-left wheels of the vehicle, each of the suspension hydraulic cylinder portions having a single port; and
   a plurality of bounce control hydraulic cylinder portions each of which is connected to the single port of a corresponding one of the suspension hydraulic cylinder portions via a pipe, for controlling a motion within the corresponding suspension hydraulic cylinder portion, wherein the plurality of the bounce control hydraulic cylinder portions are connected to form two pairs of diagonal hydraulic control cylinder portions such that hydraulic pressures in two of the bounce control hydraulic cylinder portions connected to diagonally located ones of the suspension hydraulic cylinder portions change in substantially the same way, the two pairs of diagonal hydraulic control cylinder portions being opposed to each other and connected to a device capable of controlling motions within the diagonal hydraulic control cylinder portions,
   the system further comprising:
   a rolling controller that controls rolling of a body of the vehicle; and
   a pitching controller that controls pitching of the vehicle body,
   wherein the rolling controller and the pitching controller operate independently from each other.

3. The vehicle suspension system according to claim 2, wherein the plurality of bounce control hydraulic cylinder portions comprises a first pair of bounce control hydraulic cylinder portions connected to the suspension hydraulic cylinders for front-left and rear-right wheels, and a second pair of bounce control hydraulic cylinder portions connected to the suspension hydraulic cylinder portions for front-right and rear-left wheels, and wherein the first pair of bounce control hydraulic cylinder portions form a first unit and the second pair of bounce control hydraulic cylinder portions form a second unit to provide the two pairs of the diagonal hydraulic control cylinder portions.

4. The vehicle suspension system according to claim 2, wherein pistons received in each pair of the control hydraulic cylinder portions are coupled to each other such that the pistons are movable as a unit.

5. The vehicle suspension system according to claim 2, including a motion controlling device comprising a liquid-tight structure including an accumulator and using a hydraulic fluid as a medium.

6. The vehicle suspension system according to claim 2, including a motion controlling device comprising a coil spring and a shock absorber which are located between the two pairs of diagonal hydraulic control cylinder portions.

7. The vehicle suspension system according to claim 2, wherein pistons received in the control hydraulic cylinder portions have substantially the same pressure-receiving area.

8. The vehicle suspension system according to claim 2, the rolling controller comprising a plurality of rolling control cylinder portions each of which is connected to the single port of a corresponding one of the suspension hydraulic cylinder portions via a pipe, for controlling a motion within the corresponding suspension hydraulic cylinder portion,
wherein the rolling control cylinder portions form a pair of rolling control cylinders such that hydraulic pressures in two of the plurality of rolling control cylinder portions connected to diagonally located ones of the suspension hydraulic cylinder portions change in opposite directions, the pair of rolling control cylinders being coupled by a coupling rod such that the plurality of rolling control cylinder portions associated with the front-right and rear-right wheels are oriented in the same direction and the plurality of rolling control cylinder portions associated with the front-left and rear-left wheels are oriented in the same direction, the coupling rod being coupled to a motion control device that controls a motion of the coupling rod.

9. The vehicle suspension system according to claim 8, wherein the motion control device comprises a spring element and a damping element that are connected to one end of the coupling rod.

10. The vehicle suspension system according to claim 9, wherein the motion control device comprises a coil spring serving as the spring element and a shock absorber serving as the damping element.

11. The vehicle suspension system according to claim 8, wherein the two pairs of diagonal hydraulic control cylinder portions and the pair of rolling control cylinders operate independently of each other.

12. The vehicle suspension system according to claim 2, the pitching controller comprising a plurality of pitching control cylinder portions each of which is connected to the single port of a corresponding one of the suspension hydraulic cylinder portions via a pipe, for controlling a motion within the corresponding suspension hydraulic cylinder portion,
wherein the pitching control cylinder portions form a pair of pitching control cylinders such that hydraulic pressures in two of the plurality of pitching control cylinder portions connected to diagonally located ones of the suspension hydraulic cylinder portions change in opposite directions, the pair of pitching control cylinders being coupled by a coupling rod such that the plurality of pitching control cylinder portions associated with the front-right and rear-right wheels are oriented in opposite directions and the plurality of pitching control cylinder portions associated with the front-left and rear-left wheels are oriented in opposite directions, the coupling rod being coupled to a motion control device that controls a motion of the coupling rod.

13. The vehicle suspension system according to claim 12, wherein the motion control device comprises a spring element and a damping element that are connected to one end of the coupling rod.

14. The vehicle suspension system according to claim 13, wherein the motion control device comprises a coil spring serving as the spring element and a shock absorber serving as the damping element.

15. The vehicle suspension system according to claim 12, wherein the two pairs of diagonal hydraulic control cylinder portions and the pair of pitching control cylinders operate independently of each other.

16. The vehicle suspension system according to claim 2, wherein:
the rolling controller comprising a plurality of rolling control cylinder portions each of which is connected to the single port of a corresponding one of the suspension hydraulic cylinder portions via a pipe, for controlling a motion within the corresponding suspension hydraulic cylinder portion;
the pitching controller comprising a plurality of pitching control cylinder portions each of which is connected to the single port of a corresponding one of the suspension hydraulic cylinder portions via a pipe, for controlling a motion within the corresponding suspension hydraulic cylinder portion,
wherein the rolling control cylinder portions form a pair of rolling control cylinders such that hydraulic pressures in two of the plurality of rolling control cylinder portions connected to diagonally located ones of the suspension hydraulic cylinder portions change in opposite directions, the pair of rolling control cylinders being coupled by a first coupling rod such that the plurality of rolling control cylinder portions associated with the front-right and rear-right wheels are oriented in the same direction and the plurality of rolling control cylinder portions associated with the front-left and rear-left wheels are oriented in the same direction, the first coupling rod being coupled to a first motion control device that controls a motion of the coupling rod; and
wherein the pitching control cylinder portions form a pair of pitching control cylinders such that hydraulic pressures in two of the plurality of pitching control cylinder portions connected to diagonally located ones of the suspension hydraulic cylinder portions change in opposite directions, the pair of pitching control cylinders being coupled by a second coupling rod such that a plurality of the pitching control cylinder portions associated with the front-right and rear-right wheels are oriented in opposite directions and the plurality of pitching control cylinder portions associated with the front-left and rear-left wheels are oriented in opposite directions, the second coupling rod being coupled to a second motion control device that controls a motion of the second coupling rod.

17. The vehicle suspension system according to claim 16, wherein the first motion control device includes a spring element and a damping element that are connected to one end of the first coupling rod, and the second motion control device includes a spring element and a damping element that are connected to one end of the second coupling rod.

18. The vehicle suspension system according to claim 17, wherein each of the first and second motion control devices comprises a coil spring serving as the spring element and a shock absorber serving as the damping element.

19. The vehicle suspension system according to claim 16, wherein the two pairs of diagonal hydraulic control cylinder portions, the pair of rolling control cylinders and the pair of pitching control cylinders operate independently of one another.

20. The vehicle suspension system according to claim 2, wherein the bounce control hydraulic cylinder portions operate independently from the rolling controller and the pitching controller.

* * * * *